US006587878B1

(12) United States Patent
Merriam

(10) Patent No.: US 6,587,878 B1
(45) Date of Patent: Jul. 1, 2003

(54) SYSTEM, METHOD, AND PROGRAM FOR MEASURING PERFORMANCE IN A NETWORK SYSTEM

(75) Inventor: Greg Elliott Merriam, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/310,502

(22) Filed: May 12, 1999

(51) Int. Cl.[7] .............................................. G06F 15/173
(52) U.S. Cl. ......................... 709/224; 709/223; 700/32
(58) Field of Search ................................ 709/201, 202, 709/217, 218, 219, 223, 224; 700/32

(56) References Cited

U.S. PATENT DOCUMENTS

| | | | | |
|---|---|---|---|---|
| 5,657,450 A | * | 8/1997 | Rao et al. ..................... | 709/224 |
| 5,727,129 A | | 3/1998 | Barrett et al. | |
| 5,787,254 A | * | 7/1998 | Maddalozz, Jr. et al. ... | 709/223 |
| 5,845,062 A | * | 12/1998 | Branton, Jr. et al. ........ | 709/223 |
| 5,870,769 A | | 2/1999 | Freund | |
| 5,908,467 A | * | 6/1999 | Barrett et al. ............... | 709/218 |
| 5,991,705 A | * | 11/1999 | Klein et al. .................. | 702/176 |
| 5,996,007 A | * | 11/1999 | Klug et al. ................... | 709/218 |
| 6,006,260 A | * | 12/1999 | Barrick et al. .............. | 709/224 |
| 6,012,096 A | * | 1/2000 | Link et al. ................... | 709/223 |
| 6,148,335 A | * | 11/2000 | Haggard et al. ............. | 709/224 |
| 6,157,618 A | * | 12/2000 | Boss et al. ................... | 370/252 |
| 6,216,163 B1 | * | 4/2001 | Bharali et al. ............... | 709/227 |
| 6,381,637 B1 | * | 4/2002 | Kamada ...................... | 709/218 |

OTHER PUBLICATIONS

: Computer Dictionary, Redmond, WA, Microsoft Press, 3erd Ed., Sep. 1997, see HTML.*
Issues on Information Access through the World–Wide Web, Peng, C. Chung, J. and Lin, K. pp. 1–7, http://www.geck-il.com/+e,gra +ee harvest/mirror/decweb.ethz.ch/WWW6/Workshop/wks007.htnl Apr. 3, 1997.*
Response time and display rate in human performance with computers, ACM Computing Surveys, vol. 16, Issue 3 (Sep. 1984), Shneiderman B., pp. 265–285, ISSN: 0360–0300.*
A metric for Qunatyfying Response Time in a Browser Application, Dailey D., and Brinkley, J. manuscrilt revised on Mar. 18, 1995, Publishr Item Identifier S 103–4427(96)01401–4, pp. 271–275.*
A Control–Theoretic Approach to Flow Control, Srinivasn Keshav, Computer Science, Univ. California, Berkeley & Internationa Computer Science Inst. Berkeley, CA, pp. 191–201, http:///www. acm.org/sigcomm/ccr/archive/1995/jan95/ccr–9501–keshav91.pdf.*
J.M. Almeida, et al. "WebMonitor: A Tool For Measuring World–Wide Web Server Performance", firstmonday, 1997.
"Luminate Sheds Light on R/3", Dec. 12, 1998, PC Week, vol. 15, Issue 51, pp. 1–2.
D. Hafke, "CRN Test Center Exclusive –Bay Networks' Intuitive Web PocketProbe Analyzes Bandwidth Use to Maintain Network Health, Uptime", Jul. 27, 1998, Computer Reseller News Issue 800, pp. 1–4.
"Latest Network Management Products", Sep. 1, 1998, Communication News, vol. 35, pp. 1–7.
R. Lee, et al., "Charlotte: An Automated Tool for Measuring Internet Response Time", 1999, Novell, pp. 1–22.

* cited by examiner

Primary Examiner—Mark R. Powell
Assistant Examiner—Beatriz Prieto
(74) Attorney, Agent, or Firm—David W. Victor; Konrad Raynes Victor & Mann LLP

(57) ABSTRACT

Disclosed is a method, system, and program for generating network performance data. Performance information including a performance time to download a page and execute the page within an application program is received. The received performance information is processed and then performance information output indicating network performance is generated in response to processing the performance information.

5 Claims, 6 Drawing Sheets

| Page ID (Field 162) | Performance Time Server/Remote Probe (Field 164) | Performance Time Server/Server Probe (Field 166) | Network Delay Time (Field 168) | Network Delay/ Ping Ratio (Field 170) |
|---|---|---|---|---|
| Page 20a | 12 seconds | 11 seconds | 1 second | 1 sec/2ms |
| Page 20b | 15 seconds | 12 seconds | 3 seconds | 3 sec/2ms |
| Page 20c | 17 seconds | 13 seconds | 4 seconds | 4 sec/2ms |

SYSTEM, METHOD, AND PROGRAM FOR MEASURING PERFORMANCE IN A NETWORK SYSTEM

BACKGROUND OF THE INVENTION

1. Field of the Invention

The present invention relates to a method, system and program for measuring client performance in network system in general and the Internet in particular.

2. Description of the Related Art

One of the problems facing electronic commerce over the Internet, i.e., World Wide Web, is the delays in processing electronic transactions and returning information to a customer or user. Electronic commerce includes both purchasing products or services over the Internet as well as including advertisements in web pages that are otherwise freely available. A customer at a remote location from a merchant's server may experience a delay of several seconds to a couple of minutes to perform each step of an electronic transaction, including the steps of retrieving information on the transaction, retrieving an order form to display in the customer's Web browser, transmitting the filled out form to the merchant's Internet server form, and then receiving confirmation of the completion of the transaction. Further, the customer may experience substantial delays when purchasing and downloading multi-media files or programs over the Internet. Still further, users web pages that include requested information, such as newspaper articles, along with advertisements, may experience significant delays in retrieving the desired web page. The sum total of delays for each of these operations may discourage users from engaging in electronic commerce over the Internet.

There are many possible causes of delays in processing Internet transactions. A user may have a slow communication device, such as a low speed modem which substantially limits bandwidth. Further, a merchant's server may be experiencing significant traffic which increases the system load and causes transactions to be queued, i.e., wait-listed. Still further, delays may be caused by the route a file takes when transmitted across the Internet. To transfer a file across the Internet, the file is broken into many packets, which are then transferred across multiple routers to the end user, where they are assembled to form the complete file. The transmission of a packet over a router is referred to as a hop. Each time a packet is forwarded to a router a hop occurs. Transmission time increases as a packet makes hops. Delays further include the time for the graphical user interface (GUI) at the customer computer to display the information transmitted over the Internet.

Currently, there are utilities that can measure certain performance aspects in the route of Internet transmissions. For instance, there are utilities which test a server's ability to handle Internet file requests by load and stress testing the server with file requests. Traceroute and Packet Internet Groper ("Ping") programs determine the route of a file transmitted over the network, i.e., all the intermediary routers and hosts through which the packets of the file passed. Traceroute and Ping are helpful for determining whether specific IP addresses are functioning, whether file packets are being lost or dropped when transmitted over the network, and the response times for requests. Large variances in the response time of Pings, also referred to as "jitter," can indicate a cause of poor Internet performance.

Notwithstanding the usefulness of the present Internet performance measurement utilities, as electronic commerce extends world wide, electronic commerce merchants need tools to estimate and determine the response times for electronic Internet transactions from customers located at IP addresses throughout the world. Further, current performance utilities may measure certain network transmission times and paths, but do not measure specific client response times, such as the time it takes for the customer to display information requested from the server.

The lack of tools to adequately measure response time performance can prevent merchants from accurately assessing the cause of delays. Further, without adequate performance measurement tools, merchants cannot optimize and tailor the design of Web pages to accommodate the bandwidth limitations of both the customer computers and network communication paths between the merchant server and customers. If merchants cannot accurately estimate the response time from the customer end, then they may not realize problems with the design of the web page, especially delays in downloading merchant web pages, that are discouraging customers from using electronic commerce to purchase products over the Internet. Moreover, the importance of the Internet as a sales and marketing channel is increasing exponentially. Thus, the need for accurate response time measurement tools is ever more apparent and necessary to operate in the new "on-line" economy.

SUMMARY OF THE PREFERRED EMBODIMENTS

To overcome the limitations in the prior art described above, preferred embodiments disclose a system, method, and program for generating network performance data. Performance information including a performance time to download a page and execute the page within an application program is received. The received performance information is processed and then performance information output indicating network performance is generated in response to processing the performance information.

In further embodiments, executing the page comprises displaying the entire contents of the page. Still further, executing the page may comprise executing a script program to input data into the displayed page. The page including the input data is then transmitted and a response concerning the transmitted page is received. In such case, the performance time further includes the time to enter the input data into the page, transmit the page including the input data, and receive the response.

In still further embodiments, a network address at a location remote from the server is determined. The performance information output may then be used to estimate a performance time for a hypothetical device at the network address to download and execute the page.

With preferred embodiments, performance data may be gathered from remote computers and then used to assess network performance and/or estimate performance times at any network address, such as an IP address, worldwide. In preferred embodiments, the performance time includes both the network delay time and the client performance time. The network delay time includes the time to transmit a request to the server, have the server process the request and generate a response page, and then transmit the response page back to the client. The client performance time includes the time for the client processor and system resources to display the received response in a browser. Further, the client performance time may include time for the client to enter data into the received page, transmit the page to the server for processing, and then receive confirmation of the page with the inputted data from the server.

In this way, the performance time includes all the delay time a user, such as a customer, experiences when engaging in transactions with a remote server. With commercial transactions, the performance time can include the time to download a purchase order from a merchant's server, enter data into the purchase order, submit the purchase order to the server, and receive confirmation that the purchase order was processed. Merchants can use actual performance time information to estimate performance time at IP addresses at any location in the world. These estimated performance times provide an accurate estimate of all delays a consumer might experience, including network delays and client performance delays. With this information, a merchant or other web site host can determine whether the design of their web site, including the number of pages and content within the pages, produces unacceptable delays in user/customer processing that needs to be addressed in order to avoid losing customers dissatisfied with the delays.

BRIEF DESCRIPTION OF THE DRAWINGS

Referring now to the drawings in which like reference numbers represent corresponding parts throughout:

FIG. 6 illustrates an example of gathered and calculated data in accordance with preferred embodiments of the present invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
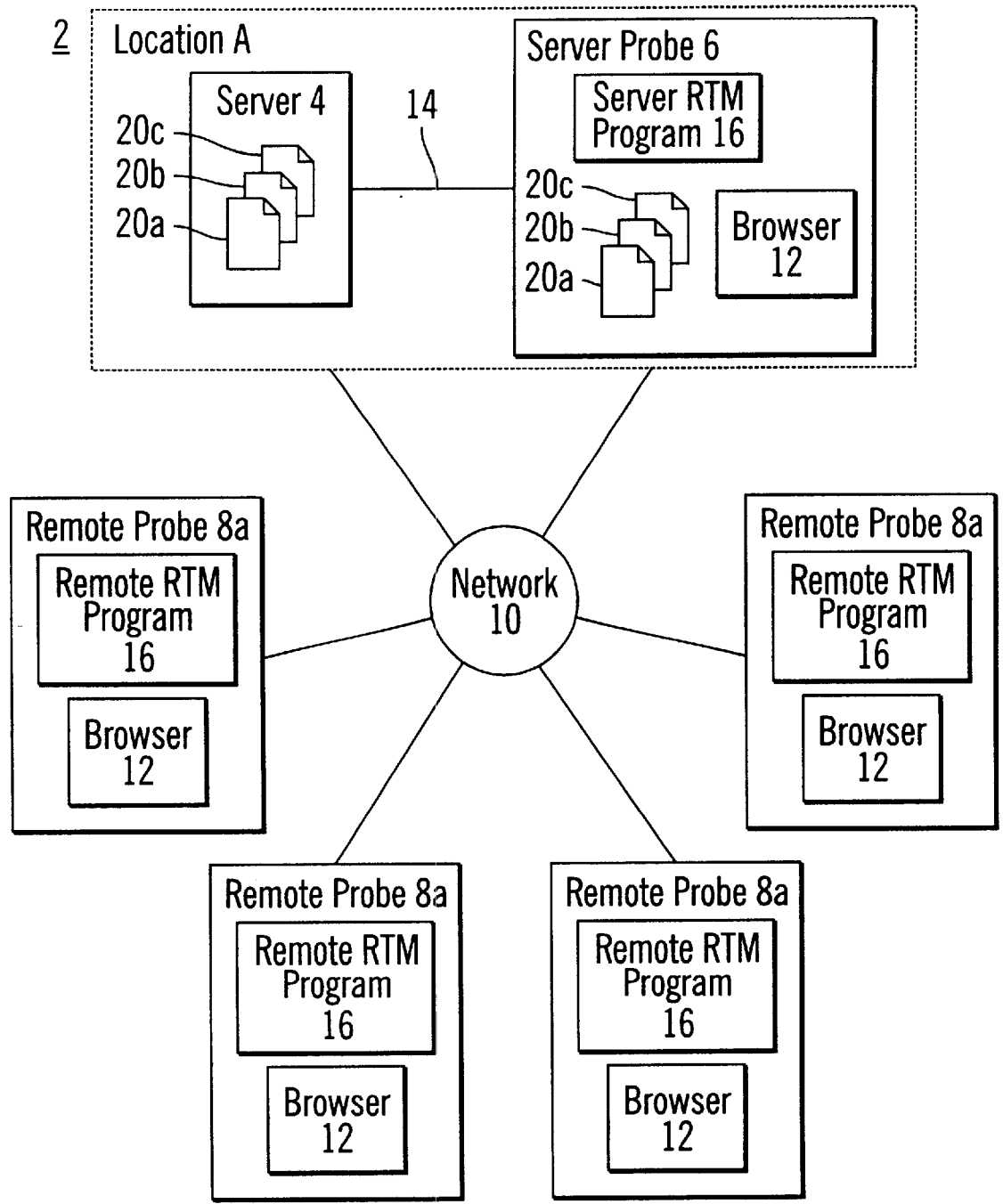
FIG. 1 is a block diagram illustrating a computing environment in which preferred embodiments of the present invention are implemented.

FIG. 1 illustrates a hardware and software environment in which preferred embodiments are implemented. A computing environment 2 comprises a server 4, server probe 6, multiple remote probes 8a, b, c, d, and a network 10 providing communication therebetween. The server 4 may be any server device known in the art capable of servicing network requests, e.g., the IBM NETFINITY®, AS/400®, and RS/6000®; and POWEREDGE® from Dell Computer Corporation. In preferred embodiments, the server 4 would include Hypertext Transfer Protocol (HTTP) software to service HTTP requests from the server probe 6 and remote probes 8a, b, c, d. Further, the server probe 6 would also include HTTP software to service requests for documents from the remote probes 8a, b, c, d. The server 4 and server probe 6 may also include software to handle document requests in data transfer protocols other than HTTP, such FTP, Gopher, WAIS, NNTP, SMTP, etc. The server probe 6 would additionally include software to function as a client generating document requests in any of the protocols. The server probe 6 and remote probes 8a, b, c, d include one or more browser programs 12 that can submit document requests to the server 4. In preferred embodiments, the browser programs 12 are Hypertext Markup-Language (HTML) browsers, e.g., NETSCAPE® Communicator, the MICROSOFT® Internet Explorer, Spry Mosaic, NCSA Mosaic, Lynx, Opera, GNUscape Navigator, etc., that include HTTP software to function as HTTP clients capable of transferring requests for documents to the server 4. The HTTP server protocol is described in "Hypertext Transfer Protocol—HTTP/1.1," Network Working Group, Request for Comments No. 2068 (January, 1997), which publication is incorporated herein by reference in its entirety. The browser program 12 may also include plug-ins or additional program features to process files in other media formats, such as sound files, movie files, JAVA™ applets**, etc.

The network 10 may be a TCP/IP network, such as the Internet and World Wide Web, or any other network system known in the art, e.g., LAN, Ethernet, WAN, System Area Network (SAN), Token Ring, LocalTalk, TCP/IP, the Internet, etc. Alternatively, there may be separate and different networks between the server 4, server probe 6, and remote probes 8a, b, c, d. Further, the computing environment 2 may include a separate network 14, such as an Intranet, to provide additional communication paths between the server 4 and server probe 6. In preferred embodiments, the server 4 and server probe 6 are in the same geographical location, i.e., location A, such as the same building, room, city, plant site, etc. In alternative embodiments, the server 4 and server probe 6 may be in separate geographical locations. The remote probes 8a, b, c, d may be dispersed throughout geographical locations, such as different cities, states, countries, etc.

The server 4 and server probe 6 further include in a storage area, e.g., hard disk drive, tape drive, cache, etc., pages 20a, b, c, which are files intended for transmittal over the network 10. The pages 20a, b, c may include any text or media data known in the art, such as text, graphical images, sound files, movies, Java applets, etc. Certain of the pages 20a, b, c may be forms including fields in which the user may enter data for the purpose of resubmitting back to the server 4 for further processing. For instance, certain pages 20a, b, c may be customer purchase order forms in which the customer enters purchase related information. Alternatively, the forms may include fields in which the user requests information, which causes the server 4 to perform database search operations. In preferred embodiments, the server 4 and server probe 6 maintain the same pages 20a, b, c.

In preferred embodiments, the server probe 6 and remote probes 8a, b, c, d are comprised of computer systems that are representative of the computer systems a likely user or customer would use. The merchant or web site host setting up the computing environment 2 to measure Internet performance for an electronic commerce web site would want to implement the server 6 and remote 8a, b, c, d probes in computers that would likely be used by their customers. For instance, the server 6 and remote 8a, b, c, d may be implemented in a personal computer that includes a common processor, such as an INTEL PENTIUM processor at a speed that is commonly used, e.g., 166 MHZ, a common operating system, such as Microsoft WINDOWS®, OS/2®, etc., and a common browser 12, e.g., Netscape, etc. For instance, if the merchant is selling software most often used in personal computers, then an Intel Pentium type machine with Microsoft Windows may be used to implement the probes 6, 8a, b, c, d. However, if the merchant is selling UNIX® products, then the probes 6, 8a, b, c, d would be implemented in hardware and software typically used by UNIX users. In preferred embodiments, the server probe 6 is implemented as the same computing system as the remote probes 8a, b, c, d to allow the server probe 6 to measure performance with respect to the server 4 that is not subject to distance factors.

Figure 2:
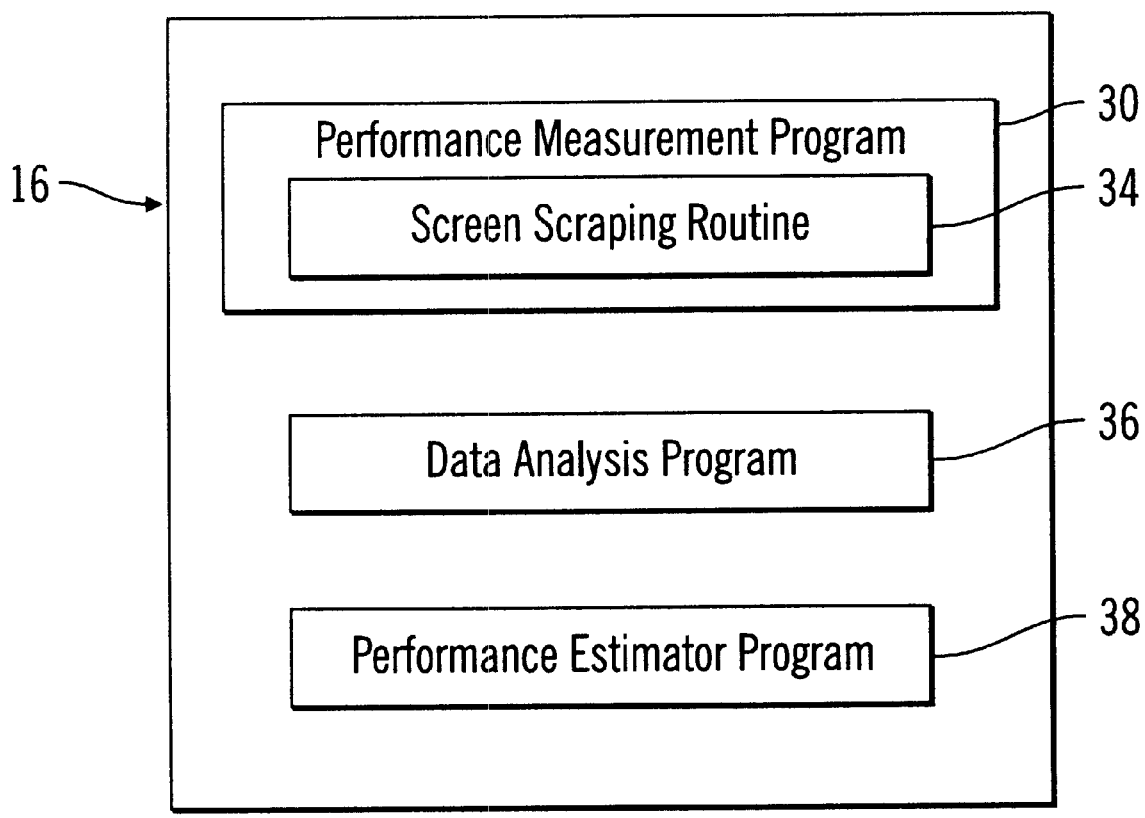
FIG. 2 is a block diagram of software components in which preferred embodiments of the present invention are implemented.

In preferred embodiments, both server probe 6 and remote probes 8a, b, c, d include a response time measurement (RTM) program 16, illustrated in FIG. 2. The RTM program 16 may be implemented as a stand alone application program that includes the program logic in which the performance measurement tools of the preferred embodiments are implemented. Preferably, these programs are written in an object oriented computer language, such as JAVA**, that may be executed on different operating system platforms.

**NETSCAPE is a registered trademark of the Netscape Communications Corporation; WINDOWS and MICROSOFT are registered trademarks of Microsoft Corporation; OS/2, NETFINITY, AS/400, and RS/6000 are registered trademarks of International Business Machines Corporation; UNIX is a registered trademark licensed by the X/Open Company LTD; INTEL and PENTIUM are registered trademarks of Intel Corporation; JAVA is a trademark of Sun Microsystems, Inc; POWEREDGE is a registered trademark of the Dell Computer Corporation.

FIG. 2 provides details of the program components within the RTM program 16. The RTM program 16 includes a performance measurement program 30 to measure actual performance data from downloading pages 20a, b, c from the server 4. The performance measurement program 30 in the remote probes 8a, b, c, d is configured to transmit performance measurement data to the RTM program 16 in the server probe 6. A screen scraping routine 34, included within the performance measurement program 30 measures the time to download and display or further process a page 20a, b, c. The RTM program 16 further includes a data analysis program 36 to analyze performance data collected by the probes 6, 8a, b, c, d. A performance estimator program 38 utilizes data produced by the data analysis program 36 to estimate the time in which remote computers at distant locations would download and process the pages 20a, b, c. Thus, merchants and web site hosts would estimate the time to complete electronic transactions with the performance estimator program 38.

In preferred embodiments, the same RTM program 16 is included in all the probes 6, 8a, b, c, d. In the above discussed embodiments, the RTM programs 16 in the remote probes 8a, b, c, d are configured to transmit performance data to the server probe 6 for data analysis and performance estimation at the server probe 6. System managers may then use the data analysis 36 and performance estimator 38 programs at the server probe 6, which is preferably at the same location as the server 4, to analyze network performance data. In alternative embodiments, one of the remote probes 8a, b, c, d may be configured to receive the performance data from the other remote probes and the server probe 6. For instance, to have remote probe 8a receive data, the RTM programs 16 in remote probes 8b, c, d and server probe 6 would be configured to transmit their performance data to the remote probe 8a; remote probe 8a would be configured to store its performance data. A system manager at such remote probe 8a may then run the data analysis 36 and performance estimator 38 programs to perform network performance analysis at the remote probe.

If there are many remote probes, then the performance of the probe that receives the data and its ability to run its own performance tests could be degraded by continually receiving performance data from many probes. In such case, a server computer known in the art may be added which includes a copy of the RTM program 16. All the probes 6, 8a, b, c, d may be configured to send their performance data to the added server. Data analysis and performance estimation may then be performed at the added server. The use of the added server insures that the probes' performance and ability to generate performance data that reflects the performance of a common customer or user is not adversely affected by having to receive data from all the other probes and perform data analysis operations. Still further, the added server may provide a Web page or other network accessible file that displays or provides in real-time network performance data from the probes and performance estimation data.

Gathering Performance Measurement Data

Figure 3:
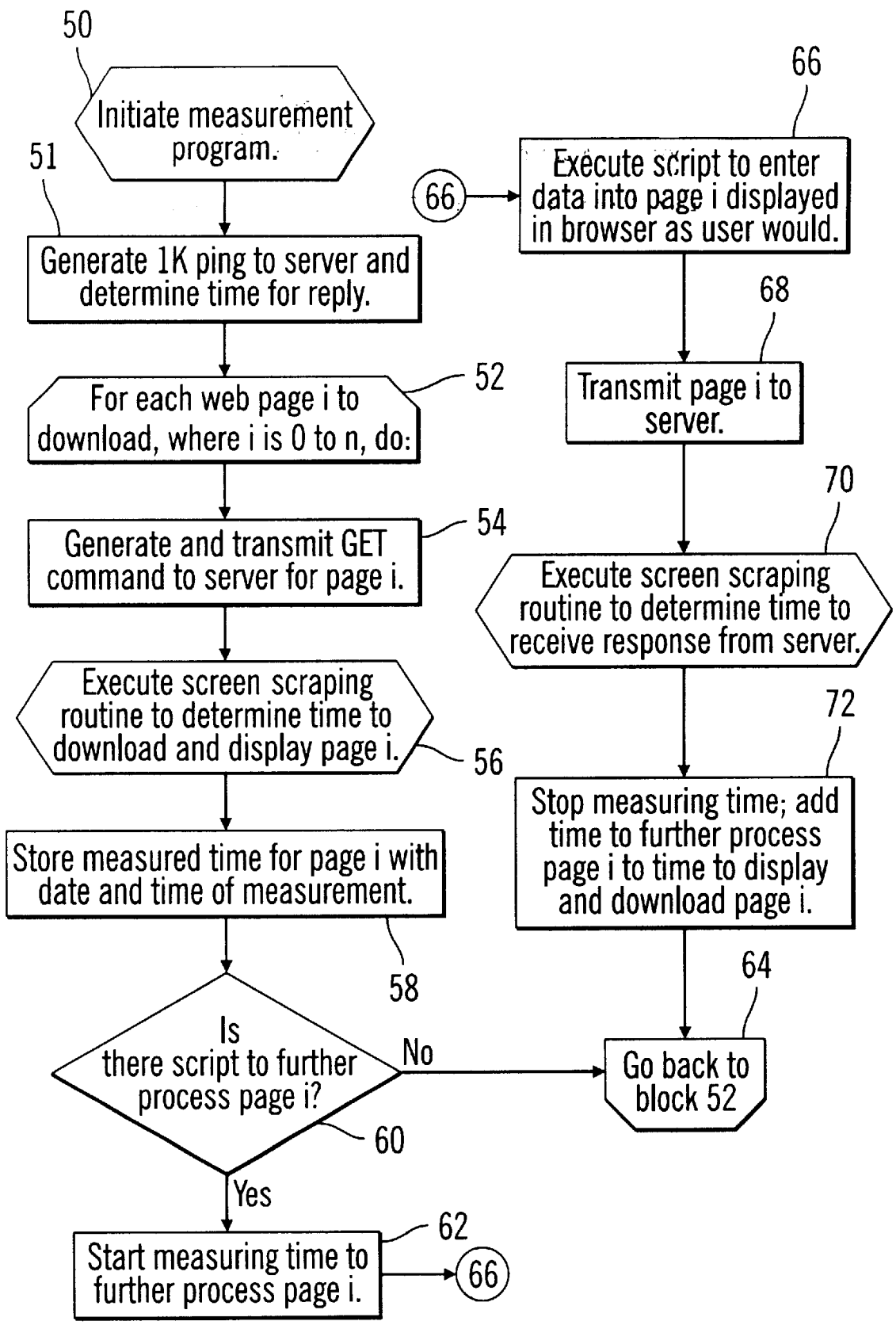
FIG. 3 illustrates logic to gather network performance data in accordance with preferred embodiments of the present invention.

FIG. 3 illustrates logic implemented in the performance measurement program 30 to gather performance data on the time to download, display, and/or process web pages from the server 4. Control begins at block 50 with the remote probe 8a, b, c, d or server probe 6 executing the performance measurement program 30. The program 30 may be set to execute at predetermined time periods to measure performance data at different times of the day and/or on different days. For instance, the web site host may want to measure performance data during peak usage hours, such as during business hours or in the early evening when users have time after work to access the Internet, and at non-peak usage, such as in the late evening or weekends. The predetermined times to run the performance measurement program 30 may also be set to time periods when customers are most likely to access the merchant's web site to engage in commercial transactions. In preferred embodiments, the web site host may set such predetermined times at which to execute the program 30 at the server probe 6. The predetermined times may then be transmitted to the remote probes 8a, b, c, d to set their times. Further, both the server 6 and remote 8a, b, c, d probes are preferably configured to execute the performance measurement programs 30 at the same time and date to insure that both gather performance data under similar network 10 circumstances, as the network response time may vary significantly throughout the day and on different days.

After initiating the performance measurement program 30, a 1K ping is generated from the remote probe 8a, b, c, d to the server 4 to determine a response time in milliseconds. Details of "pinging" are described in the published Request For Comments (RFC) no. 792, entitled "Internet Control Message Protocol" (September, 1981), by J. Postel, which document is incorporated herein by reference in its entirety. Any pinging method known in the art may be used. A loop then begins (at block 52) to gather performance data for i pages, where i is an integer from 0 to n. For instance, if a commercial transaction requires the user to download and, in some instance, process a sequence of i pages, then the performance data would be gathered for each of the i pages involved in the commercial transaction. The loop begins (at block 54) with the performance measurement program 30 generating and transmitting a request for a page i, e.g., a HTTP GET command for web page i at a Universal Resource Locator (URL) at the host web site. The performance measurement program 30 then (at block 56) calls a screen scraping routine 34 (the details of which are described below with respect to FIG. 4) to determine the time to download and display page i in the browser 12 graphical user interface (GUI). The term "performance time" with respect to a page i, as used herein, refers to the time to download and display page i. The term "performance data" as used herein refers to the collection of performance times over numerous instances at one or more of the probes 6, 8a, b, c, d. In this way, the performance time captures not only the network transmission time to download a page, but also the time to display or otherwise execute the downloaded page in the browser 12. Total performance time is impacted by both the network transmission time, which is affected by network factors and connection capabilities, and the probes 6, 8a, b, c, d processing capabilities, which is preferably representative of the customer's processing capabilities. If the page 20a, b, c includes media other than images and text, such as sound files, movie files and/or Java applets, then the "display" time would include the time to complete presenting the information in the sound file, movie file or Java applet to the user within the user's browser 12. In this way, a measurement of performance time includes the total wait time the user must endure to obtain information, regardless of the media in which the information is implemented.

After determining the performance time for page i (at block 56), the performance measurement program 30 stores (at block 58) the measured performance time for page i, along with other information, such as the time and date the performance time was measured. The performance measurement program 30 then determines (at block 60) whether a script routine is provided to perform further processing of page i, which at this moment is displayed or executing in the browser 12. If there is a script program for page i, then the performance measurement program 30 starts (at block 62) measuring the time to further process page i. If there is no script program for page i, then another iteration (at block 64) of the loop beginning at block 52 is performed if there are further pages 20a, b, c to download and process. After starting time measurement (at block 62), the performance measurement program 30 executes (at block 55) the script to perform the further processing operation. For instance, if page i, is a form in which the user or customer enters information, then the script may cause the probe 6, 8a, b, c, d to enter input information into the form fields of page i in the same manner a user would. The script may include other processing operations, such as saving the page i at a specific location or including in a message to transfer to another location. There may be a separate script program unique to each page i, as the fields included in different pages 20a, b, c may require different script operations.

If the script program enters input data into form fields in page i, then the performance measurement program 30 transmits (at block 68) the page i, including the input data, to the server 4 and then executes the screen scraping routine 34 (at block 70) to determine the time to receive a response from the server 4 indicating that page i has been processed, e.g., the electronic purchase was received and is being processed by the merchant. After receiving a response (at block 70), the performance measurement program 30 stops measuring the performance time to further process page i, and adds the performance time to process page i with the script program and receive confirmation to the time to download and display page i, which was stored at block 58. In this way, the performance time with respect to a page i that is downloaded and further processed includes the time to download and display the page 20a, b, c, the time for the user to enter information into the page, submit the filled-in page to the server 4, have the server 4 process the page, and then receive confirmation that the transmitted filled-in page was processed. The performance measurement program 30 may then perform (at block 64) another iteration of the loop beginning at block 52 if there are further pages 20a, b, c to process.

Figure 4:
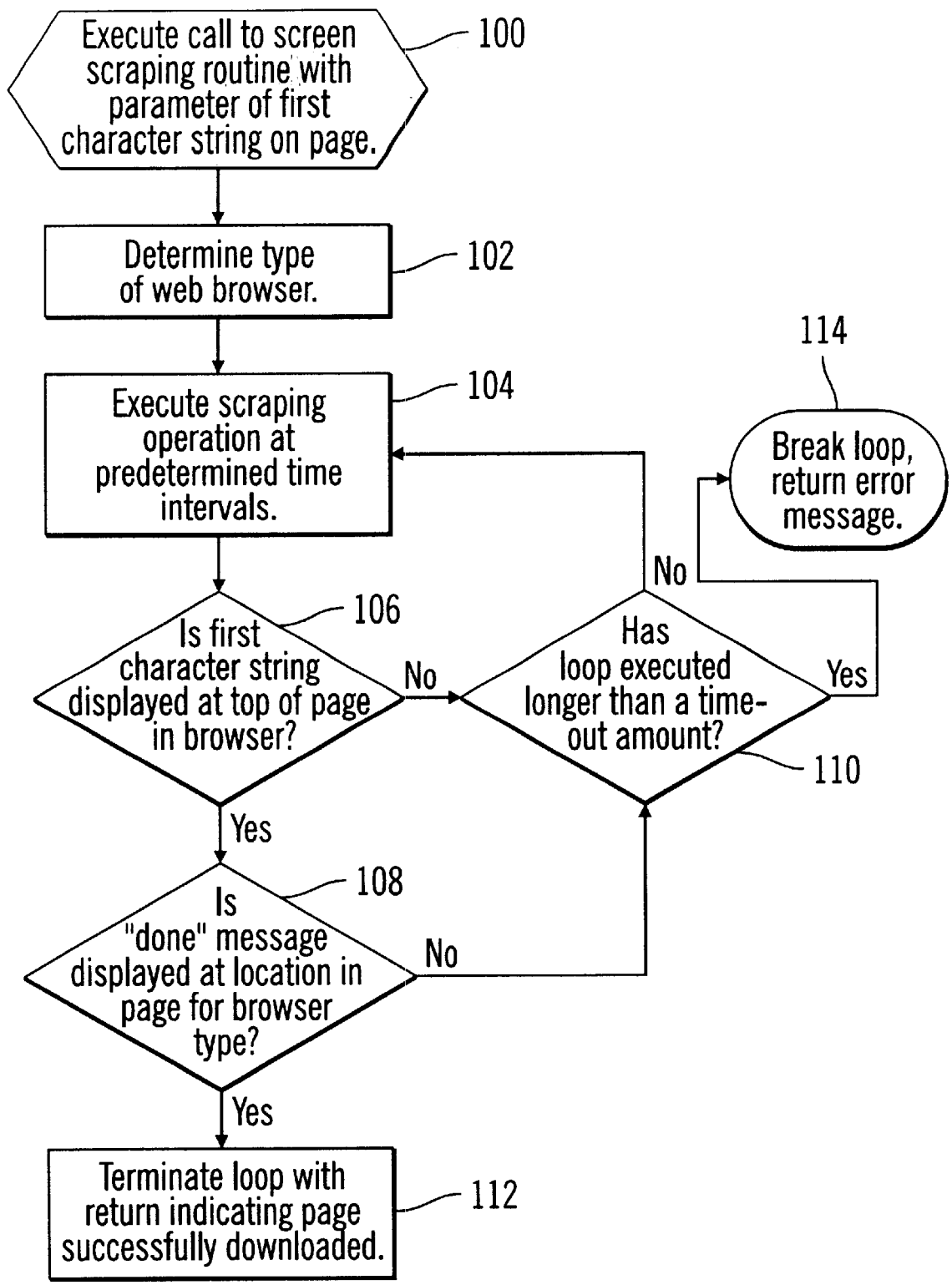
FIG. 4 illustrates logic to measure network performance time in accordance with preferred embodiments of the present invention.

FIG. 4 illustrates the program logic of the screen scraping routine 34. Control begins at block 100 with a call to the screen scraping routine 34 from within the performance measurement program 30 to determine the performance time for an action, such as downloading and displaying a web page or transmitting a page and receiving a response. In preferred embodiments, the performance measurement program 30 calls the screen scraping routine 34 with a parameter of the first character or character string that will be displayed at the top of the page 20a, b, c for which the performance time is being measured. Orientation information of this character string on the page 20a, b, c being downloaded may also be provided. After being called (at block 100), the screen scraping routine 34 determines the brand type of the browser 12, e.g., Netscape, Windows Explorer, etc. The screen scraping routine 34 will include different sets of code to perform certain operations for different browser types if the probes 6, 8a, b, c, d include multiple browsers. For instance, the code to determine whether the browser 12 is displaying a "done" indicator differs according to the type of browser 12. The screen scraping routine 34 then begins a loop (at block 104) of scraping operation to perform continuously until the loop is broken. After beginning the loop (at block 104), the screen scraping routine 34 determines (at block 108) whether the character string provided with the call is displayed at the top position in the browser 12 GUI. If so, the screen scraping routine 34 then determines whether a "done" message is displayed in the browser 12 GUI, at the location where such message is displayed for the browser 12 type. If the character string is not displayed at the top of the browser 12 GUI (at block 106), then the screen scraping routine 34 determines (at block 110) whether the loop has been executing longer than a predefined time-out period. If so, the loop and screen scraping routine 34 terminates (at block 114) with a return of an error message indicating that the page 20a, b, c did not successfully download. If the time-out period has not been exceeded, then the screen scraping routine 34 performs another iteration of the scraping operation loop (at block 104) after a predetermined time has elapsed since the previous iteration of the loop at block 104. For instance, the scraping operation could be performed sixty times per minute to accurately determine the time to completely download and display or run the requested page 20a, b, c.

If the "done" message is displayed (at block 108), then the screen scraping routine 34 terminates the loop starting at block 104 and returns (at block 112) indication that the page has been successfully downloaded and displayed in the browser 12. Otherwise, if "done" is not displayed, then the screen scraping routine 34 proceeds to perform another iteration of the loop at block 104 if the time-out period is not exceeded.

If the performance measurement program 30 returns a downloaded page 20a, b, c filled-in with data to the server 4, then the reply time would include the time for the server 4 to process the returned page 20a, b, c, such as time to do any database searches or processing requested by the page 20a, b, c or that must be performed to process the returned page 20a, b, c. For instance, if the user enters search information into the page 20a, b, c submitted to the server 4, then the reply time would include the time for the server 4 to execute the search, retrieve requested information, and return such information to the probe 6, 8a, b, c, d. Alternatively, the server 4 may have to execute database searches using data entered in the returned form to verify certain information before completing the transaction and returning verification to the probe 6, 8a, b, c, d.

If the screen scraping routine 34 is measuring the time to generate a sound file or display a movie file, in the event that the page 20a, b, c is in alternative media formats, then the screen scraping routine 34 would include logic to monitor information displayed in plug-in programs and/or the browser 12 to determine when the presentation of information in such alternative media formats has completed.

Analyzing Performance Data

After the performance measurement programs 30 have gathered performance times with respect to downloading and processing the pages 20a, b, c, then the remote probes 8a, b, c, d would transmit the gathered performance data to the server probe 6 for analysis and estimation. The data analysis program 36 processes the performance times to produce information that the merchant may review or the performance estimator program 38 may use to estimate worldwide delay times. The data from the probes 6, 8a, b, c, d includes the identity information on the probe 6, 8a, b, c, d that. conducted the test, test time, ping time, and the performance times by page 20a, b, c.

Figure 5:
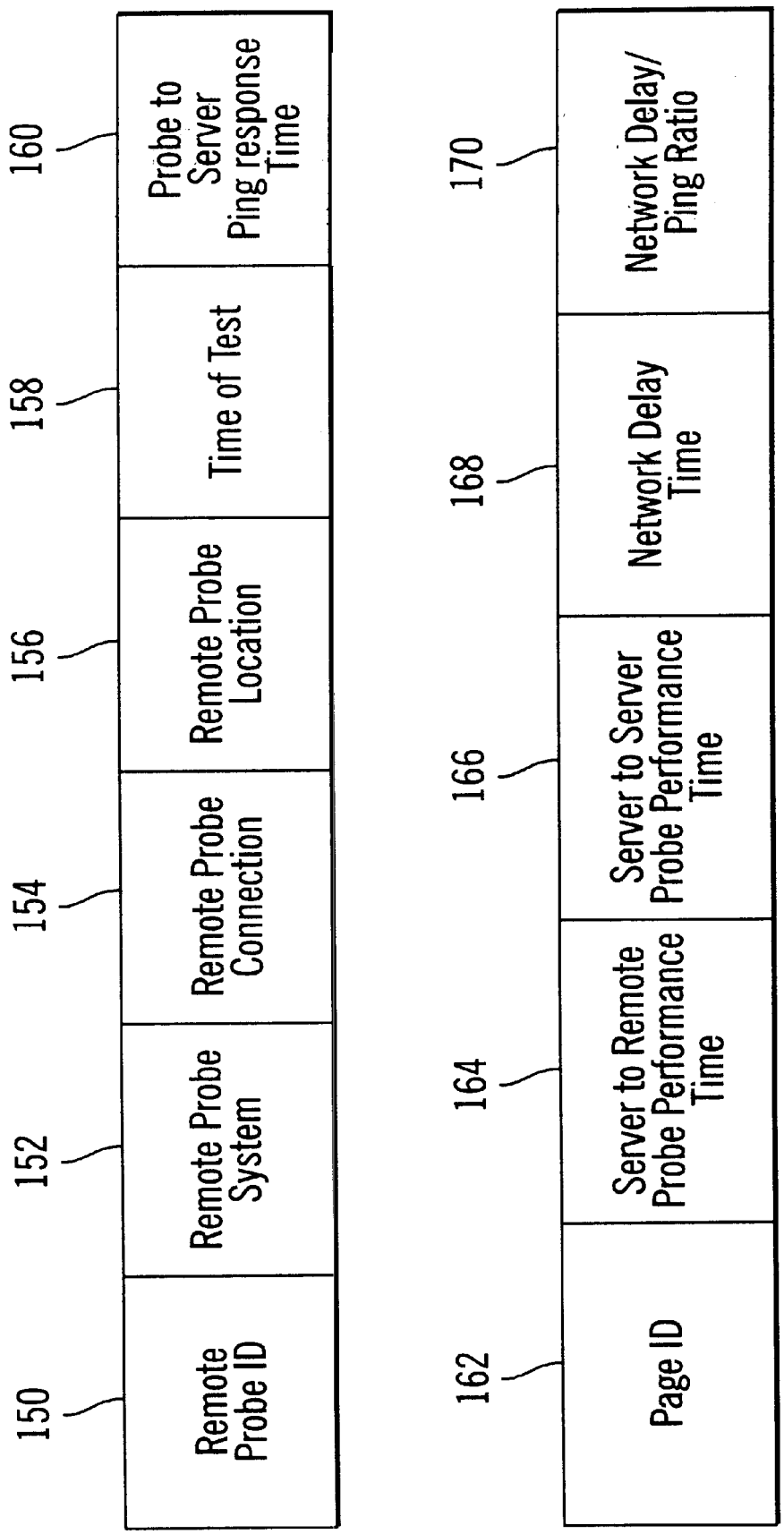
FIG. 5 illustrates data structures for maintaining performance data in accordance with preferred embodiments of the present invention.

FIG. 5 illustrates a preferred embodiment of how the data analysis program 36 may group the performance data received from the performance measurement programs 30 into various fields. The grouped fields of data may be stored in a database program or other storage format. In FIG. 5, a group of fields 150–156 include information on a particular remote probe 8a, b, c, d and a performance test. Field 150 includes a remote probe 8a, b, c, d identifier; field 152 indicates the hardware and operating system for the remote probe 8a, b, c, d identified in field 150; field 154 indicates the connection device included in the remote probe 8a, b, c, d identified in field 150, e.g., cable modem, telephone modem, T-1 line, etc.; field 156 indicates the geographical location of the remote probe 8a, b, c, d identified in field 150; field 158 identifies the date and time when a performance test was initiated; and field 160 indicates the ping reply time in milliseconds between the remote probe 8a, b, c, d identified in field 150 and the server 4 at the performance time.

Fields 162–170 include performance times with respect to a page 20a, b, c and calculated information. In preferred embodiments, there is an instance or record of fields 162–170 for each page 20a, b, c downloaded and/or further processed as part of a performance test at a particular remote probe 8a, b, c, d, identified by fields 150–160. Thus, for each group of fields 150–160 that identify a remote probe 8a, b, c, d and performance test there are one or more instances of fields 162–170 for each performance test performed with respect to a page 20a, b, c. Field 162 indicates page 20a, b, c identification information on the page 20a, b, c subject to the performance test, including information on the page size; field 164 provides the performance time to request, receive and display or run, and, perhaps, perform further processing of the page 20a, b, c indicated in field 162; field 166 provides the performance time for the server probe 6 to perform the same operation that generated the performance time for field 162. Preferably, the server probe 6 would perform the operation at the same time the remote probe 8a, b, c, d performed the operation; field 168 provides a network delay time calculated by the data analysis program 36 by subtracting the performance time in field 166 from the performance time in field 164; and field 170 provides a network delay to ping ratio that the data analysis program 36 calculates by dividing the network delay time in field 168 by the ping response time in the related field 160.

The information in the fields is useful in assessing performance with respect to customers attempting to access pages 20a, b, c in the server 4. The performance time in field 164 indicates the total time for a remote probe 8a, b, c, d to process a page 20a, b, c from the server 4. This information indicates not only network transmission time, but processing time in the remote probe 8a, b, c, d to display or generate the transmitted page 20a, b, c or the time for the remote probe 8a, b, c, d to enter information and submit a downloaded page 20a, b, c back to the server 4 for further processing and confirmation. The performance time, thus, provides the total time the user or customer must wait to retrieve and view a page 20a, b, c from the merchant's server and/or submit a page, perhaps including a purchase order. Field 166 indicates a performance time measurement for the same operation yielding the performance time in field 164, but performed between the server probe 6 and server 4. This value includes delay factors that may be inherent in the server 4, i.e., the time for the server to retrieve and return a page 20a, b, c, including overall network load and other network transmission factors that do not include the transmission distance factors of transmitting a page 20a, b, c between the server 4 and the remote probe 8a, b, c, d at a distant geographical location. As discussed, the server probe 6 is preferably located in the same location A as the server 4.

The network delay time in field 168, which the data analysis program 36 calculates by subtracting the performance time in field 166 from the performance time in field 164, indicates a network transmission time that includes primarily the transmission delay due to routing a page through the network 10 and across the geographical distance between the server 4 and remote probe 8a, b, c, d. For instance, transmission from the server 4 to the remote probe 8a, b, c, d may involve the transmission of the file in multiple packets through multiple routers, i.e., hops. At the routers, the transmission may be routed to various intermediary routers before reaching the target location indicated by the IP address. Thus, the network delay time in field 168 indicates delays associated with routing the transmission packets through multiple routers between the server 4 and remote probe 8a, b, c, d, including the multiple routers, regional network traffic, and the router traffic management algorithms that affect transmissions. The performance time, indicated in field 166, for transmissions between the server 4 and server probe 8a, b, c, d is typically less than the performance time, indicated in field 164, because the transmission between the server 4 and physically proximate server probe 6 requires far fewer hops than the transmission between the remote probe 8a, b, c, d and the server 4. In this way, by subtracting the performance time in field 166, the data analysis program 26 is subtracting delay times due primarily to server 4 factors, such as load, server traffic, and the server input/output processing capabilities.

The network delay time to ping ratio in field 168 provides a correspondence of the actual network delay time for a particular page with a 1K ping, which is page size independent, between the remote probe 8a, b, c, d and server 4. This ratio in field 168 is used to estimate, as discussed below, performance times between the server 4 and hypothetical clients at IP addresses at remote geographical locations. The network delay time to ping ratio in field 168 is maintained for each of the different pages 20a, b, c subject to performance testing. In preferred embodiments, the pages 20a, b, c are selected to represent a range of page sizes 20a, b, c that will be transmitted between a customer at the remote probe 8a, b, c, d and the server 4.

A Multiple Socket Simultaneous Feed Connection Factor (MSSF Page factor) is a network delay factor concerning delays caused by increases in file size. Files transmitted over a TCP/IP network, such as the Internet, are broken down into multiple packets and then separately transmitted through routers to reach the target destination. In network transmissions, the algorithms in the routers queue larger files for longer periods of time than smaller files. Further, the larger files are broken down into smaller packets at the routers, and may be transmitted through different routes to reach the target computer. For these reasons, it takes longer to route a larger file through the Internet, and through the various routers, than a smaller file. This file size factor that increases network delay is the MSSF Page Factor. The network delay time in field 168 and network delay to ping ratio in field 170 are maintained for each page 20a, b, c included in the performance test. Thus, differences in the network delay time among the pages 20a, b, c having different sizes reflects the MSSF Page Factor.

FIG. 6 provides a table 200 including an example of the values that may be included in fields 162–170 for performance tests at a remote probe 8a, b, c, d. Information for the performance tests on the remote probe 8a, b, c, d, the time of the tests, and ping time would be maintained in related fields 150–160. The table 200 includes instances of the fields 162–170 for performance tests for pages 20a, 20b, and 20c. In this example, the ping response time in field 160 is 2 milliseconds and page 20a is smaller in size then page 20b, which is smaller in size than page 20c. As can be seen from the column for field 164 in FIG. 6 that provides the performance time between the server 4 and remote probe 8a, b, c, d, as the page size increases, the performance time increases from 12 seconds to 15 seconds to 17 seconds. This reflects the additional network transmission time to transmit a larger page over the network 10 which is likely caused, in part, by the MSSF Page Factor. The third column includes field 166, i.e., the performance time to transmit the page between the server 4 and server probe 6. This time is less than the performance time for the remote probe 8a, b, c, d because, in preferred embodiments, the server probe 6 is physically proximate to the server 4. The network delay time, i.e., field 168, increases as the page 20a, b, c size increases. As mentioned, this increase in network delay is due, in part, to the MSSF Page Factor, reflecting the longer time to transmit over the Internet network 10 a larger page than a smaller page. The network delay to ping ratio, i.e. field 170, is calculated for each page 20a, b, c and increases as the page size increases also reflecting, in part, the greater amount of network transmission time to transfer a larger page.

Other techniques may be used to calculate the values described above. For instance, during data gathering, instead of measuring the performance time between the remote probe 8a, b, c, d and server 4, the performance time can be measured between the server probe 6 and remote probe 8a, b, c, d by having the remote probe 8a, b, c request and submit pages to the server probe 6 in the same manner the remote probe 8a, b, c, d would request and submit pages to the server 4. The logic of FIGS. 3 and 4 may be used to gather performance time data for operations between the remote probe 8a, b, c, d and server probe 6. Performance times between the server probe 6 and remote probes 8a, b, c, d would reflect a network transmission time that does not incorporate load and traffic burdens on the server 4 that cause delays in response times as the server probe 6 does not experience the network traffic that the server 4 experiences. Alternatively, to incorporate some, but not all, of the delays due to server load and traffic, the performance time between the server 4 and the remote probe 8a, b, c, d in field 164 can be calculated by averaging the performance time between the remote 8a, b, c, d and server 6 probes and the remote probe 8a, b, c, d and server 4. This will incorporate some aspect of server 4 load and traffic as such server load and traffic factors effect the real network transmission time customers at the remote probes 8a, b, c, d experience.

The performance estimator program 38 may utilize the data processed and generated by the data analysis program 36 to estimate the remote probe to server performance time using equation (1) below:

$$(ND/PING\ RATIO)*(IP\ PING)+(S\text{-}SP\ PT) \tag{1}$$

The ND/PING RATIO is the network delay time to ping ratio maintained in field 170. The IP PING is the response time when the performance estimator program 38 pings an IP address at a location in the world to estimate the time to retrieve and/or further process a web page from that IP address location. The S-SP PT is the server to server probe performance time, which is maintained in field 166, which is added back to the estimated network delay time to provide an estimated remote probe to server performance time. This estimated remote probe to server performance time is the estimated time for a customer at a computer, having a configuration similar to the configuration of the probes 6, 8a, b, c, d, at the location of the IP PING.

The performance estimator program 38 may average the network delay to ping ratios, in field 168 for a given page 20a, b, c and across remote probes 8a, b, c, d to obtain an averaged ND/PING RATIO and average the server to server probe performance times for a given page 20a, b, c and across remote probes 8a, b, c, d to obtain an average S-SP PT. These averaged ND/PING RATIO and S-SP PT values may then be used with an IP PING to estimate the performance time at a hypothetical user or customer computer at the pinged IP address. Alternatively, the performance estimator program 38 could average the ND/PING RATIO and S-SP PT for a given page 20a, b, c across remote probes 8a, b, c, d in a distinct geographical location to provide more accurate geographical estimates. For instance, the averaged ND/PING RATIO and S-SP PT could be specific to a geographical area, thereby providing an estimate that incorporates network delays specific to that geographical location, as well as page size and traffic specific to the time and date of the performance test.

Other ways of averaging and combining the gathered data may be used to generate averages of the ND/PING RATIO and S-SP PT to use with equation (1). For instance, averages can be taken across test times, i.e., field 158.

Preferred embodiments thus allow merchants or other web site hosts to estimate the time for a hypothetical user or customer at a remote IP address to download, display the web page, and perform further precessing, such as submitting a filled in downloaded page to the server to process and provide confirmation. Preferred embodiments allow such estimated wait times to be specific to particular dates and times, geographical area, and page size. In this way, the web site host or merchant can determine delay times at different times of day, e.g., peak usage hours or off-peak usage hours, at different geographical locations, e.g., Japan, United States, California, Britain, etc., and for different page sizes. Providing an estimate that is based on performance data for a particular web page size incorporates MSSF Page Factor delays in transmitting the web page between the hypothetical user at the IP address and server. Further, the estimated wait times would incorporate wait times for specific computer systems the user or customer would have because the values in equation (1) that are used to estimate the performance times are based on the hardware and software configuration of the probes 6, 8a, b, c, d.

Based on the estimated delay times for hypothetical customers at IP addresses around the world, a merchant can then determine whether the estimated network delays are acceptable, i.e., unlikely to discourage users or customers from requesting the pages or performing electronic commerce through the pages. If the delay times are unacceptable, then the web site host or merchant may modify, if necessary, the web pages to reduce the network delays customers around the world would experience when accessing the web pages that comprise the commercial transaction. To minimize delay times, the merchant may reduce the content in the web pages to reduce the size of the pages, thereby reducing delays attributed to the MSSF page factor, or consolidate the content from multiple pages into fewer pages. Alternatively, if the merchant or web site host believes that the network delay time could be increased without discouraging access, the merchant or host may increase the content and/or number of web pages involved in the transaction to provide more information, additional advertisements or enhance the presentation of the information.

CONCLUSION

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

In preferred embodiments the probes 6, 8a, b, c, d and server 4 were described as having particular configurations. However, in further embodiments the probes 6, 8a, b, c, d may be comprised of any network client device and the server 4 may be comprised of any network server device. Further, as discussed additional computers, such as servers, that are not functioning as probes may be used to gather the probe data and run the data analysis and performance estimation programs.

Preferred embodiments of the data fields used to maintain performance data were described with respect to FIG. 5. However, in alternative embodiments, additional data types may be added or data fields removed. Further, alternative arrangements and relations of the fields and performance data may be provided according to database management techniques known in the art, including relational database management techniques.

In preferred embodiments the gathered data was used to estimate delay times at hypothetical computers around the world. In alternative embodiments, the web site host or merchant may just review a presentation of the gathered data to analyze the acceptability of network delay times without performing estimates of delay times using the performance estimator program.

Preferred embodiments discussed the advantages of estimating network delay times with respect to commercial transactions, such as purchasing products. However, web site hosts in general would be interested in the preferred embodiment estimation technique even if users are not purchasing products from the web site host. For instance, many web site hosts, such as newspapers, provide information for free and present advertisements with the free information. Significant network delays for such "free" information could discourage browsing activity at the web site, which would reduce the number of people viewing advertisements and, hence, reduce advertisement revenues. Thus, web site hosts providing advertisements along with free information would want to estimate network delay times to determine the maximum number of advertisements that may be included on a page and still create acceptable network delay times that would not unduly discourage browsing activities. For such uses, the network delay time to estimate would include the time for a user to request a page, the server to obtain the requested page and perform any necessary database searches, the time to transmit the requested information to the user, and the time for the user computer to display the requested information.

In summary, preferred embodiments disclose a system, method, and program for generating network performance data. Performance information including a performance time to download a page and execute the page within an application program is received. The received performance information is processed and then performance information output indicating network performance is generated in response to processing the performance information.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating network performance data, comprising:

receiving performance information including a performance time to download a page and execute the page within an application program;

processing the received performance information;

generating performance information output indicating network performance in response to processing the performance information;

determining a network address at a location; and utilizing the performance information output to estimate a performance time for a hypothetical device at the network address to download and execute the page, wherein the performance information further includes a response time, and wherein utilizing the performance information to estimate the performance time for the hypothetical device at the network address comprises:

calculating a ratio of the performance time to the response time;

determining a response time for the hypothetical device at the network address; and applying the ratio to the hypothetical device response time to estimate the performance time for the hypothetical device at the network address.

2. The method of claim 1, wherein the hypothetical device response time is determined by performing a PING operation to the network address.

3. The method of claim 1, wherein there are multiple performance times and a base performance time, wherein the ratio of the performance time to the response time is calculated by:

(i) determining a network delay time by subtracting the base performance time from the performance time; and (ii) determining the ratio by dividing the network delay time by the response time, wherein applying the ratio to estimate the performance time for the hypothetical device at the network address further comprises determining an estimated network delay time by multiplying the hypothetical device response time times the ratio and adding the base performance time to the estimated network delay time.

4. The method of claim 1, wherein ratios are calculated for different page sizes, and wherein the performance time is estimated according to a specific page size.

5. The method of claim 1, wherein the ratio applied to estimate the performance time for the hypothetical device at the network address is calculated by averaging ratios across performance times.

* * * * *